United States Patent [19]

Nemeni et al.

[11] 4,430,591
[45] Feb. 7, 1984

[54] STATOR COIL OF A HIGH-VOLTAGE GENERATOR

[76] Inventors: Tibor M. Nemeni, ulitsa Khalturinskaya, 11, kv. 245; Alexandr I. Nikolsky, ulitsa Dubninskaya, 14, korpus 2, kv. 59; Sergei S. Mosolov, bulvar Yana Rainisa, 7, kv. 9, all of Moscow, U.S.S.R.

[21] Appl. No.: 413,387
[22] PCT Filed: Dec. 24, 1980
[86] PCT No.: PCT/SU80/00211
  § 371 Date: Aug. 23, 1982
  § 102(e) Date: Aug. 23, 1982
[87] PCT Pub. No.: WO82/02289
  PCT Pub. Date: Jul. 8, 1982
[51] Int. Cl.³ .............................................. H02K 11/00
[52] U.S. Cl. ........................................ 310/71; 310/45; 310/60 A; 310/64; 310/208; 336/62
[58] Field of Search ................... 310/71, 260, 43, 254, 310/45, 179, 54, 57, 58, 59, 60 R, 60 A, 64, 65, 180, 184, 198-208; 336/62

[56] References Cited

U.S. PATENT DOCUMENTS

| 3,510,700 | 5/1970 | Grinchenko et al. | 310/59 |
| 3,955,110 | 5/1976 | Karlen | 310/59 |
| 4,164,672 | 8/1979 | Flick | 310/54 |
| 4,207,482 | 6/1980 | Neumeyer et al. | 310/45 |
| 4,229,671 | 10/1980 | Lesokhin et al. | 310/71 |

FOREIGN PATENT DOCUMENTS

| 2823988 | 2/1979 | Fed. Rep. of Germany | 310/45 |
| 1176033 | 4/1956 | France | 310/58 |
| 1540613 | 9/1968 | France | 310/58 |
| 2378388 | 8/1978 | France | 310/58 |
| 1278035 | 6/1972 | United Kingdom | 310/260 |
| 2823988 | 2/1979 | Fed. Rep. of Germany | 310/45 |
| 2378388 | 8/1978 | France | 310/58 |
| 1540613 | 9/1968 | France | 310/58 |
| 1176033 | 4/1956 | France | 310/58 |

OTHER PUBLICATIONS

Article entitled "High Voltage Technology", edited by M. V. Kostenko, "Vyshaya shkola" Publishers, Moscow, 1973 (Russian language article w/trans.)

Primary Examiner—R. Skudy
Attorney, Agent, or Firm—Fleit, Jacobson, Cohn & Price

[57] ABSTRACT

The estator coil of a high-voltage generator comprises an electrical lead-in (1) of conductive material, turns (2) of conductive material coated with layers (6) of turn-to-turn insulation with a screen layer (7). The electrical lead-in (1) is fashioned as a tube. The stator coil of a high-voltage generator further comprises cooling pipes (3) adjoining the turns (2) and having side openings (4, 5), and insulating members (9). Each insulating member (8) consists of two parts (10, 11) made integral with each other. A portion of the first part (10), facing the coil turns (2), has two projections with holes communicated with the side openings (4 or 5) in the cooling pipes (3). The insulating member (9) is provided with passages communicated with spaces in the projections. The insulating members (9) are arranged concentrically with the electrical lead-in tube (1), and each pair of said insulating members forms an insulating tube (8) for the supply of cooling agent, made up of two parts. One part of the insulating tube presents a hollow cylinder with projections while its other part presents a truncated hollow cone. Each insulating tube (8) for the supply of cooling agent is separated from a subsequent tube by several insulation layers (12) serving a continuation of the corresponding layers (6) of turn-to-turn insulation, with a screen layer (13) presenting an uninterrupted continuation of the screen layer (7) of the turn-to-turn insulation layers (6).

1 Claim, 6 Drawing Figures

STATOR COIL OF A HIGH-VOLTAGE GENERATOR

TECHNICAL FIELD

The present invention relates to the manufacture of electrical machinery and, more particularly, it relates to a stator coil of a high-voltage generator.

BACKGROUND ART

Modern trends in power engineering are characterized by a tendency towards an ever increasing level of the operating voltage of electrotechnical devices such as power transmission lines, transformers and generators, which helps increase their efficiency figure.

However, an increase of the operating voltage level for electrical machines poses the problem of developing novel designs of their windings whose insulation would be capable of operating under conditions of elevated voltage. In particular, an increase of generator voltage raises the problem of developing a high-voltage stator winding employing, for example, high-voltage stator coils.

The prototype to the disclosed technical solution is found in a stator coil of a high-voltage generator (cf., G. N. Aleksandrov, V. L. Ivanov, K. P. Kadomskaya, N. A. Kozyrev, M. V. Kostenko, G. S. Kuchinskii, I. F. Polovoi, B. M. Rayab, V. A. Hoberg "Tekhnika vysokikh napriazhenii"—High Voltage Technology, Vyschaiya Shkola Publishers, Moscow, 1973, pp. 456–457).

The stator coil of a high-voltage generator comprises an electrical lead-in made of an electrically conductive material and coupled electrically to the beginning of the first turn of the coil. The coil turns made of conductive material are coated with several layers of turn-to-turn insulation with a screen layer applied on top, while the turn-to-turn insulation and the screen layer of each subsequent turn, starting with the first turn, envelop all the preceding turns.

In the prior art design of a stator coil of a high-voltage generator, insulation cones formed by insulation layers adjoining the electrical lead-in are characterized by their large size. Said prior art stator coil of a high-voltage generator lacks reliability in operation, which hampers the manufacture of generators rated for high voltages of the stator winding (110 kV, 220 kV and above). The prior art design of the stator coil of a high-voltage generator does not permit of direct cooling of the stator winding.

Large overall dimensions of the stator coil of a high-voltage generator are due to the fact that in the zone where the insulation continuity may be disturbed, i.e., in the zone of the electrical lead-in and insulation cones adjoining the latter, the electric field distribution is non-uniform which may lead to an insulation on breakdown. In order to eliminate this risk, the insulation layers and screen layers applied on top of the latter form insulation cones whose length is proportional to the need of reducing the electric field intensity to a preset value, which results in a great length of each insulation cone increasing sharply with the growth of rated voltage.

SUMMARY OF THE INVENTION

The invention is directed toward the provision of a stator coil of a high voltage generator featuring an increased reliability and reduced overall dimensions.

This is attained owing to the fact that in a stator coil of a high-voltage generator, comprising an electrical lead-in of conductive material connected electrically to the beginning of a first turn of the coil, with the coil turns of conductive material being coated with several layers of turn-to-turn insulation having a screen layer applied on top, while the turn-to-turn insulation and the screen layer of each subsequent turn, starting with the first turn, envelop all the preceding turns, according to the invention, the electrical lead-in is fashioned as a tube while the stator coil of a high-voltage generator further comprises cooling pipes adjoining the respective turns, closed at their ends and provided with side openings for the inlet and outlet of a cooling agent, insulating members arranged concentrically with the electrical lead-in tube and consisting of two parts made integral with each other, a first one of said two parts facing the coil turns presenting a half of a hollow cylinder separated from the latter by a diametral plane accommodating the longitudinal axis of said cylinder while a portion of said first part facing the coil turns has two projections provided each on the inner side thereof with holes communicated with the side openings in the cooling pipes, a second part of the insulating member presenting a half of a truncated hollow cone separated from the latter by a diametral plane accommodating the longitudinal axis of said truncated cone coinciding with the longitudinal axis of said cylinder, the greater base of the second part coinciding with the base of the first part most removed from the coil turns, the insulating member being further provided along the axis thereof with passages communicated with spaces in the projections, insulating tubes for the supply of the cooling agent, each one of said insulating tubes formed by a pair of insulating members being made of two parts integral with each other, one of said parts presenting a hollow cylinder with projections facing the coil turns while the other one of said parts presents a truncated hollow cone whose greater base coincides with the base of cylinder most removed from the coil turns, the holes in the projections of one of the insulating members communicating with the corresponding side openings of the cooling pipe for the inlet of the cooling agent and the holes in the projections of the other insulating member communicating with the corresponding side openings provided in the same cooling pipe for the outlet of the cooling agent, while each insulating tube for the supply of the cooling agent is separated from the subsequent tube by several insulation layers presenting a continuation of the corresponding layers of turn-to-turn insulation, with a screen layer applied on top and presenting an unbroken continuation of the corresponding screen layer of the turn-to-turn insulation layers, the truncated cone of the insulating tube for the supply of the cooling agent adjoining the electrical lead-in tube being most removed from the first turn of the coil while the truncated cone of each subsequent insulating tube for the supply of the cooling agent tightly adjoining the preceding insulation layers is less removed from the first turn of the coil and the greater bases of the truncated cones of the insulating tubes for the supply of the cooling agent are located at a preset distance from each other.

The present invention facilitates direct cooling of the turns of a stator coil of a high-voltage generator, as well as helps reduce the overall dimensions of the coil and increase its reliability in operation. This makes realistic the problem of developing stator coils of powerful high-voltage generators for stator winding voltages of up to 500 kV. The use of such high-voltage generators helps save electrotechnical materials by ovbiating the need to employ step-up transformers.

BRIEF DESCRIPTION OF THE DRAWINGS

This invention will be better understood upon considering the following detailed description of an examplary embodiment thereof, with due reference to the accompanying drawings in which.

BEST MODE OF CARRYING OUT THE INVENTION

Figure 1:
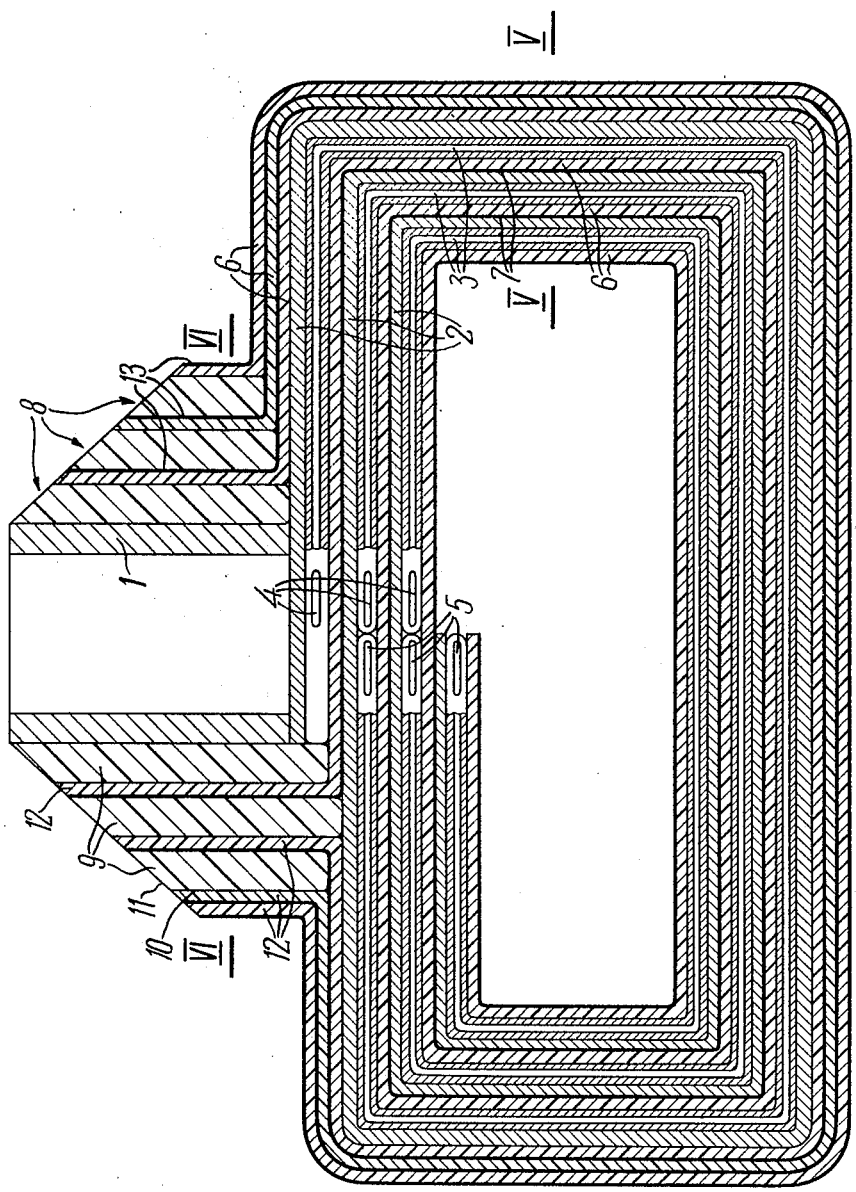
FIG. 1 shows a stator coil of a high-voltage generator, according to the present invention, in longitudinal section.

Referring now to FIG. 1 of the accompanying drawings, the herein disclosed stator coil of a high-voltage generator comprises an electrical lead-in 1 fashioned as a tube of conductive material and connected electrically to the beginning of a first turn 2 of the coil. The stator coil of a high-voltage generator includes three turns 2 made as continuously wound buses of conductive material. Adjoining each turn 2 is a cooling pipe 3 closed at the ends and having two side openings 4 for the inlet of a cooling agent and two side openings 5 for the outlet of the cooling agent. The turns 2 are coated with several layers 6 of turn-to-turn insulation with a screen layer 7 applied on top of said insulation layers, while the turn-to-turn insulation 6 and the screen layer 7 of each subsequent turn 2, starting with the first turn 2, envelop all of the preceding turns 2.

The stator coil of a high-voltage generator further comprises insulating tubes 8 for the supply of cooling agent, each made up of two insulating members 9. Each insulating member 9, via which the cooling agent is supplied to the cooling pipes 3, consists of two parts 10, 11 made integral with each other. The first part 10 facing the coil turns 2 presents a half of a hollow cylinder, separated from the latter by a diametral plane accommodating the longitudinal axis of the cylinder.

Each insulating tube 8 for the supply of cooling agent is separated from the subsequent insulating tube 8 for the supply of cooling agent by several insulation layers 12 serving a continuation of the corresponding turn-to-turn insulation 6, with a screen layer 13 applied on top and serving a continuation of the corresponding screen layer 7.

Figure 2:
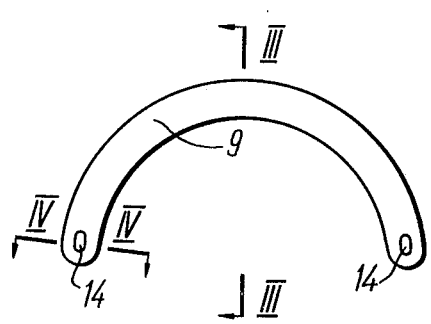
FIG. 2 is a top view of an insulating member, according to the present intention.
Figure 3:
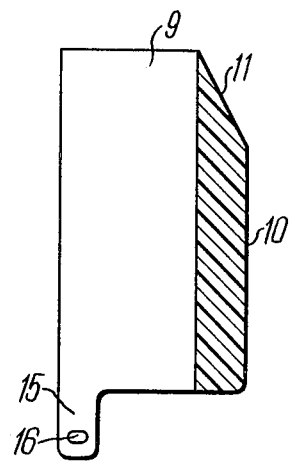
FIG. 3 is a longitudinal section taken along the line III—III of FIG. 2, according to the present invention.

Provided in each insulating member 9 (FIG. 2) along the axis thereof are two channels 14. A portion of the first part 10 (FIG. 3) facing the coil turns 2 (FIG. 1) has two projections 15 (FIG. 3) provided each on the inner side thereof with holes 16.

Figure 4:
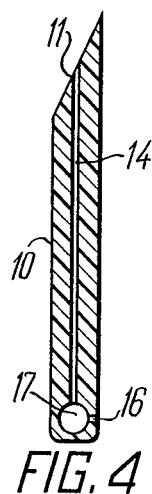
FIG. 4 is a longitudinal section taken along the line IV—IV of FIG. 2, according to the present invention.

The passages 14 (FIG. 4) are communicated with corresponding spaces 17 in the projections 15 (FIG. 3) while said spaces 17 (FIG. 4) are communicated with the holes 16.

The second part 11 (FIG. 1) presents a half of a truncated hollow cone separated from the latter by a diametral plane accommodating the longitudinal axis of the truncated cone coinciding with the longitudinal axis of the aforesaid cylinder. The greater base of the second part 11 coincides with the base of the first part 10 most removed from the coil turns 2.

The insulating tubes 8 for the supply of the cooling agent are arranged concentrically with the tube of the electrical lead-in 1. Each pair of the insulating members 9 forms the insulating tube 8 for the supply of the cooling agent, consisting of two parts made integral with each other. One of said parts presents a hollow cylinder with the projections 15 (FIG. 3) facing the coil turns 2 (FIG. 2) and is made up of two parts 10 of the respective pair of the insulating members 9 which form the respective insulating tube 8 for the supply of the cooling agent.

Another of said parts is a hollow truncated cone, the larger basis of which essentially coincides with the basis of the cylinder farthest removed from the coil turns 2 and is defined by two parts 11 of the corresponding pair of the insulating elements 9 which form the corresponding insulating tube for the supply of the cooling agent.

The truncated cone of the insulating tube 8 for the supply of the cooling agent tightly adjoining the tube of the electrical lead-in 1 is most removed from the first coil turn 2 while the truncated cone of each subsequent insulating tube 8 for the supply of the cooling agent tightly adjoining the preceding insulation layer 12 is less removed from the first coil turn 2 and the greater bases of the truncated cones of the insulating tubes 8 for the supply of the cooling agent are located at a preset distance from each other.

In the insulating tube 8 for the supply of the cooling agent, two holes 16 of the projections 15 (FIG. 3) are communicated with the respective side openings 4 (FIG. 1) of the cooling pipe 3, designed for the inlet of the cooling agent, while the other two holes 16 in the projections 15 (FIG. 3) are communicated with the respective side openings 5 (FIG. 1) provided in the same cooling pipe 3 for the outlet of the cooling agent.

Figure 5:
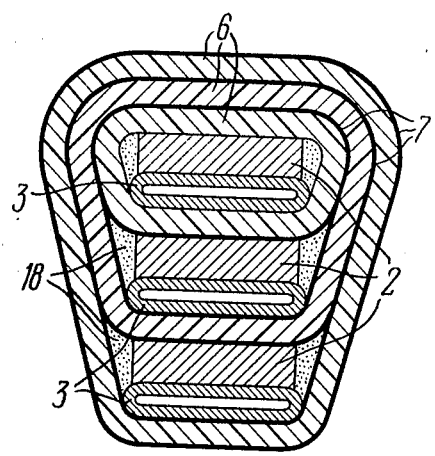
FIG. 5 is a cross-section taken along the line V—V of FIG. 1, according to the present invention.

Presented in FIG. 5 is a cross-section taken on the line V—V of FIG. 1, which gives an idea of the coil shape in cross-section.

The space between the side surfaces of the coil turns 2, cooling pipes 3 and respective insulation layers 6 is filled with a filler 18 (such as an epoxy compound).

Figure 6:
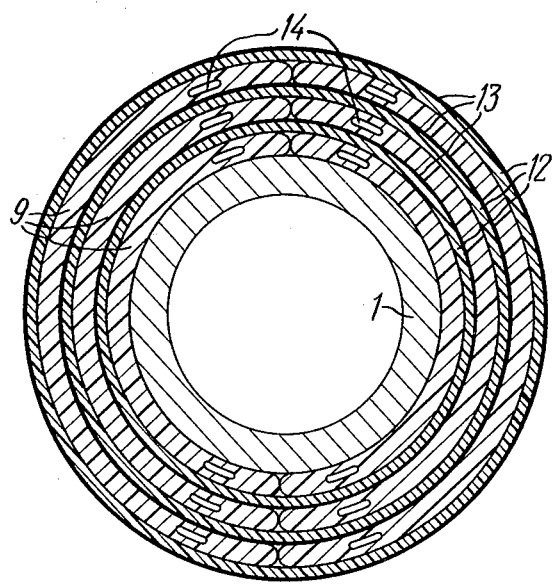
FIG. 6 is a cross-section taken along the line VI—VI of FIG. 1, according to the present invention.

FIG. 6 shows a cross-section taken on the line VI—VI of FIG. 1, giving an indication of the relative position of each pair of insulating members 9 forming the given insulating tube 8 for the supply of the cooling agent.

The herein disclosed design of a stator coil of a high-voltage generator is noted for its small overall dimensions thanks to the use of the insulating tubes 8 (FIG. 1) for the supply of the cooling agent separated by several insulation layers 12 which serve a continuation of corresponding turn-to-turn insulation 6, with the screen layer 13 applied on top and serving a continuation of the corresponding screen layer 7. By maintaining the continuity of the insulation layers 6, 12 and of the screen layers 7, 13, the preservation of a weakly nonuniform electric field in the region of the electrical lead-in 1 is ensured, same as in any cross-section of the stator coil of a high-voltage generator.

This helps ensure the reliability of insulation. Since the voltage across the adjacent screen layers 13 is preset and, therefore, the potential difference between them is a constant and preset value (i.e., independent of the mutual capacitances between the adjacent screen layers 13, the tube of the electrical lead-in 1 and the generator housing (not shown), the preset distance between the greater bases of the truncated cones of the insulating tubes 8 for the supply of the cooling agent and the overall height of the electrical lead-in 1 turn out small.

The design of the stator coil of a high-voltage generator, including the number of turns 2, depends upon the rated power and voltage for which the coil is designed.

The herein described embodiment is a coil with three turns 2.

The preset distance between adjacent insulating cones depends on the rated voltage of the generator, the number of coils in the stator winding phase and the number of turns 2 in the coil. There factors govern the preset potential difference between the adjacent screen layers 13 and the corresponding preset distance between the truncated cones.

The potential difference between two adjacent screen layers 13 is also governed by the value of e.m.f. induced in a single turn 2 of the stator coil of a high-voltage generator. The arrangement of the electrical lead-in 1 as tube, as well as the arrangement of the hollow insulating tubes 8 for the supply of the cooling agent of two parts of which one, facing the coil turns 2, presents a cylinder while the other one presents a truncated hollow cone mated therewith by the base, helps arrange the electrical lead-in 1 and adjoining insulating tubes 8 for the supply of the cooling agent analogously with a high-voltage cable terminal and makes for optimum shaping of the electric field in the region of the electrical lead-in 1 and adjoining insulating tubes 8 for the supply of the cooling agent.

For facilitating the assembly of the electrical lead-in 1 and adjoining insulating tubes 8 for the supply of the cooling agent, the latter tubes are made up each of the respective pair of insulating members 9 laid successively in the following sequence: the first pair of the insulating members 9 is laid onto the tube of the electrical lead-in 1; the second pair is laid onto the insulation layer 12 coating the first insulating member 9, and so on.

The cooling agent is supplied to the passages 14 (FIG. 2) of one of the pair of the insulating members 9 (FIG. 1) making up the given insulating tube 8 for the supply of the cooling agent. Further, the cooling agent is supplied to the spaces 17 (FIG. 4) of the projections 15 (FIG. 3) of the given insulating member 9 and, from said spaces, to the holes 16 in the projections 15 from which the cooling agent is supplied to the side openings 4 (FIG. 1) provided for the inlet of the cooling agent in the cooling pipe 3. On passing through said cooling pipe 3, the cooling agent exits via the side openings 5 provided for the outlet of the cooling agent in the same cooling pipe 3.

From the openings 5 the cooling agent passes to the spaces 17 (FIG. 4) via the holes 16 in the projections 15 (FIG. 3) of the other one of the pair of insulating members 9 making up the given insulating tube 8 (FIG. 1) for the supply of the cooling agent. From the spaces 17 (FIG. 4) the cooling agent passes in the passages 14 of said insulating member 9 (FIG. 1) to be discharged.

Each pair of the insulating members 9 provides for an analogous passage of the cooling agent via the respective cooling pipe 3.

Each cooling pipe 3 adjoins the respective coil turn 2 and ensures the removal of heat from the turn 2.

Outside of the electrical lead-in 1, the zones of delivery and discharge of the cooling agent are separated from each other by a special insulating partition (not shown).

Therefore, the present invention enables to provide stator coils of powerful high-voltage generators for the stator winding voltage of up to 500 kV, noted for their small overall dimensions and possibility of direct cooling of turns of the stator coil of a high-voltage generator.

The use of such high-voltage generators helps save electrotechnical materials.

INDUSTRIAL APPLICABILITY

This invention can be used in the manufacture of powerful generators, including turbogenerators for steam and nuclear power plants, in particular, cryoturbogenerators.

We claim:

1. A stator coil of a high-voltage generator, comprising an electrical lead-in of conductive material connected electrically to the beginning of a first turn of the coil, with the coil turns of conductive material being coated with several layers of turn-to-turn insulation having a screen layer applied on top, while the turn-to-turn insulation and the screen layer of each subsequent turn, starting with the first turn, envelop all the preceding turns, characterized in that the electrical lead-in (1) is fashioned as a tube while the stator coil of a high-voltage generator further comprises cooling pipe (3) adjoining the respective turns (2), closed at their ends and provided with side openings (4, 5) for the inlet and outlet of a cooling agent, insulating members (9) arranged concentrically with the electrical lead-in tube (1) and consisting of two parts (10, 11) made integral with each other, a first one (10) of said two parts facing the coil turns (2) presenting a half of a hollow cylinder separated from the latter by a diametral plane accommodating the longitudinal axis of said cylinder while a portion of said first part facing the coil turns (2) has two projections (15) provided each on the inner side thereof with holes (16) communicated with the side openings (4 or 5) in the cooling pipes (3), a second part (11) of the insulating member (9) presenting a half of a truncated hollow cone separated from the latter by a diametral plane accommodating the longitudinal axis of said truncated cone coinciding with the longitudinal axis of said cylinder, the greater base of the second part (11) coinciding with the base of the first part (10) most removed from the coil turns (2), the insulating member (9) being further provided along the axis thereof with passages (14) communicated with spaces (17) in the projections (15), insulating tubes (8) for the supply of the cooling agent, each one of said insulating tubes formed by a pair of insulating members (9) being made of two parts integral with each other, one of said parts presenting a hollow cylinder with projections facing the coil turns while the other one of said parts presents a truncated hollow cone whose greater base coincides with the base of cylinder most removed from the coil turns (2), the holes (16) in the projections (15) of one of the insulating members (9) communicating with the corresponding side openings (4) of the cooling pipe (3) for the inlet of the cooling agent and the holes (16) in the projections (15) of the other insulating member (9) communicating with the corresponding side openings (5) provided in the same cooling pipe (3) for the outlet of the cooling agent, while each insulating tube (8) for the supply of the cooling agent is separated from the subsequent tube by several insulation layers (12) presenting a continuation of the corresponding layers (6) of turn-to-turn insulation, with a screen layer (13) applied on top and presenting an unbroken continuation of the corresponding screen layer (7) of the turn-to-turn insulation layers (6), the truncated cone of the insulating tube (8) for the supply of the cooling agent adjoining the electrical lead-in tube (1) being most removed from the first turn (2) of the coil while the truncated cone of each subsequent insulating tube (8) for the supply of the cooling agent tightly adjoining the preceding insulation layers is less removed from the first turn (2) of the coil and the greater bases of the truncated cones of the insulating tubes (8) for the supply of the cooling agent are located at a preset distance from each other.

* * * * *